UNITED STATES PATENT OFFICE

FREDUS N. PETERS, JR., OF EVANSTON, ILLINOIS, ASSIGNOR TO QUAKER OATS COMPANY, OF CHICAGO, ILLINOIS, A CORPORATION OF NEW JERSEY

METHOD FOR THE REDUCTION OF FURFURAL ACETONE AND FURAN DERIVATIVES

No Drawing. Application filed February 28, 1927, Serial No. 171,725. Renewed January 31, 1931.

My invention relates to an improved method for the reduction of furfural and furan derivatives for the production of commercially useful products.

Heretofore the reduction of furan derivatives and especially furfural has been practiced only on a laboratory or experimental scale. One laboratory method utilizes the action of hydrogen at pressures slightly above atmospheric on liquid furfural and other furan derivatives in the presence of a noble metal catalyst such as platinum. Another laboratory method utilizes furfural in the vapor phase mixed with hydrogen passed over an iron or nickel catalyst maintained at temperatures ranging between 190° and 200° C. The first method gives relatively high yields of reduction products but is extremely expensive because of the high cost of the catalyst. The second method is inefficient because of the low yields of reduction products and the uncontrollable nature of the process which results in the production of a heterogeneous mixture of compounds whose nature or per cent cannot be predetermined.

I have discovered that the reduction of furfural and other furan derivatives can be easily and economically effected by hydrogenation under pressure at an elevated temperature in the presence of a base metal catalyst. By my improved process, the products of hydrogenation are obtained in high yields and the reduction can be so controlled that the production of undesirable products can be minimized or substantially eliminated.

The following examples are illustrative of the process of my present invention:

Example 1

An aqueous solution of 200 parts of nickel nitrate hexahydrate, $(Ni(NO_3)_2.6H_2O)$ and 80 parts of magnesium nitrate hexahydrate, $(Mg(NO_3)_2.6H_2O)$ is heated to boiling and to it is added, preferably with constant stirring, a hot aqueous solution of 80 parts of sodium hydroxide (NaOH). The precipitated hydroxides thus obtained are then filtered, washed free from nitrates and sodium compounds, dried and reduced in a stream of hydrogen for 6 to 12 hours at a temperature of 290°–330° C.

This catalyst comprising metallic nickel and magnesium oxide is then added to furfural in the proportions of 60 parts by weight to 900 parts by weight of furfural and the mixture introduced into an autoclave having an agitating device. Hydrogen is then admitted into the autoclave and maintained therein under a pressure of approximately 200 lbs., while the temperature is raised to between 90° C. and 170° C., the mixture being stirred vigorously during the process which is continued until absorption of hydrogen practically ceases.

By following the above described process high yields (90%–95% theoretical) of furfuryl alcohol are obtained.

Example 2

An aqueous solution of 847 parts of magnesium nitrate hexahydrate $Mg(NO_3)_2.6H_2O)$ and 581.6 parts of nickel nitrate hexahydrate $(Ni(NO_3)_2.6H_2O)$ is heated to boiling and to it is added, with constant stirring, a hot aqueous solution of 393 parts of sodium hydroxide. The precipitated hydroxides are filtered, washed free from nitrates and sodium compounds, dried and reduced in a stream of hydrogen for approximately 10 hours at a temperature of approximately 320° C.

This catalyst comprising metallic nickel and magnesium oxide is then added to furfural to which has been added a solvent comprising, for example, tetrahydrofurfuryl alcohol and small amounts of n-amyl alcohol, the amount of catalyst being from 2% to 5% of the weight of the furfural. The mixture is introduced into an autoclave having an agitating device and hydrogen is admitted until a pressure of from 700 lbs. to 1900 lbs. is reached. The temperature is maintained at 100° C.–140° C. and the mixture stirred vigorously for a period of approximately 7 hours.

Under these conditions a final product is obtained which is free from unsaturated compounds and which contains for the most part tetrahydrofurfuryl alcohol with small amounts of amylene glycols.

*Example 3*

To make the catalyst, 118.7 parts of nickel carbonate are thoroughly mixed with 58.7 parts of kieselguhr. The mixture is then reduced in a stream of hydrogen for approximately 3 hours at a temperature of approximately 360° C. and cooled in an atmosphere of carbon dioxide or nitrogen or other inert gas.

This catalyst is then added to furfural, with or without the addition of a solvent, in the proportions of 25 parts by weight of the catalyst to 576 parts by weight of the furfural. The mixture is introduced into an autoclave having an agitating device. Hydrogen is admitted and maintained at a pressure of 1000 lbs. to 1800 lbs., while the temperature is maintained at 90° C.–140° C. for a period of 2 hours, the mixture being stirred vigorously during the process.

Under these conditions a final product is obtained which contains a substantial amount of methyl furan.

*Example 4*

The catalyst is prepared as in Example No. 3.

The catalyst is added to a solution of 100 parts of furfural acetone in 100 parts of ethyl alcohol in the proportions of 23 parts of catalyst to 100 parts of furfural acetone. The mixture is introduced into an autoclave having an agitating device. Hydrogen is admitted and maintained at a pressure of approximately 700 lbs., while the temperature is maintained at approximately 100° C. for a period of approximately 15 minutes, the mixture being stirred vigorously during the process. At the completion of this period, the mixture is removed from the autoclave and filtered to remove the catalyst. The product is then distilled to remove the solvent alcohol and a final product is obtained which is substantially completely saturated and consists substantially of 1-tetrahydrofuryl butanol-3 with small quantities of 1-tetrahydrofuryl butanone-3.

It is to be understood that I do not desire to be limited to the exact conditions as described in the above illustrative examples.

Other alkalies such as sodium carbonate can be used as the alkaline constituent of the catalyst. Other nickel salts such as nickel sulphate can be used for the preparation of the metallic nickel, or again, the nickel hydroxide and magnesium oxide can be prepared separately and mixed and subsequently reduced. Again, the catalyst can be deposited on kieselguhr or other inert material.

The reduction of other furan derivatives, such as furoic acid, the alkyl furoates and the like has been carried out by me in a manner similar to those described above.

While I have described my invention in several of its forms it is understood that I do not desire to be limited to any of the specific details outlined above other than those pointed out in the appended claims.

I claim:

1. A method for the reduction of furfural acetone which comprises dissolving furfural acetone in a solvent therefor, and suspending in such liquid a catalyst comprising nickel while subjecting the mixture to hydrogen, under superatmospheric conditions of temperature and pressure.

2. A method for reducing a compound containing the furan ring with an aliphatic group in the 2-position by treating the compound, in the liquid state, with a catalyst comprising nickel while subjecting the mixture to hydrogen, under superatmospheric conditions of temperature and pressure.

3. A method for the production of 1-tetrahydrofuryl butanone-3 which comprises dissolving furfural acetone in a solvent therefor, and suspending in such liquid a catalyst comprising nickel while subjecting the mixture to the action of hydrogen, under superatmospheric conditions of temperature and pressure, arresting the reaction at the point where a substantial quantity of 1-tetrahydrofuryl butanone-3 is produced, and then removing the same from the reaction mixture.

4. A method for the reduction of furfural acetone which comprises dissolving furfural acetone in a solvent therefor, and suspending in such liquid a catalyst comprising nickel while subjecting the mixture to hydrogen, under superatmospheric conditions of temperature and pressure, and continuing this reaction until the furfural acetone is substantially completely reduced to 1-tetrahydrofuryl butanol-3.

5. The method of claim 2 in which the reaction is stopped at a predetermined point prior to complete hydrogenation of the original furan compound.

6. A method for reducing a compound containing the furan ring with an aliphatic group in the 2-position which comprises dissolving the compound in a solvent therefor and suspending in such liquid a catalyst comprising nickel while subjecting the mixture to the action of hydrogen under superatmospheric conditions of temperature and pressure and stopping the reaction at a predetermined point prior to complete hydrogenation of the original furan compound.

In witness whereof, I have hereunto subscribed my name.

FREDUS N. PETERS, Jr.